(No Model.) 2 Sheets—Sheet 1.
H. R. LEWIS & C. B. PHILLIPS.
PROCESS OF EXTRACTING METALS FROM REFRACTORY ORES.
No. 487,188. Patented Nov. 29, 1892.
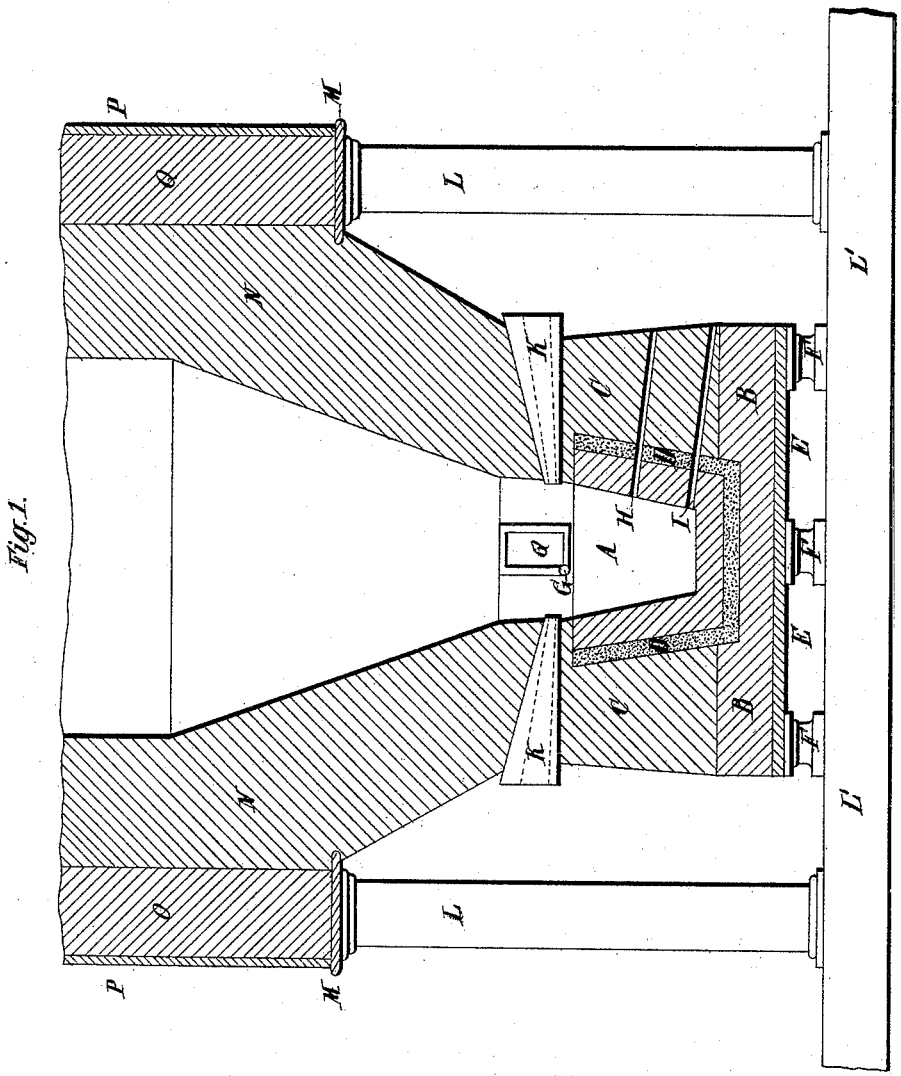
Witnesses:
Geo. W. Rea.
Robert Enutt
Inventors.
Henry R. Lewis
Charles B. Phillips.
By James L. Norris
Atty.
THE NORRIS PETERS CO., PHOTO-LITHO., WASHINGTON, D. C.

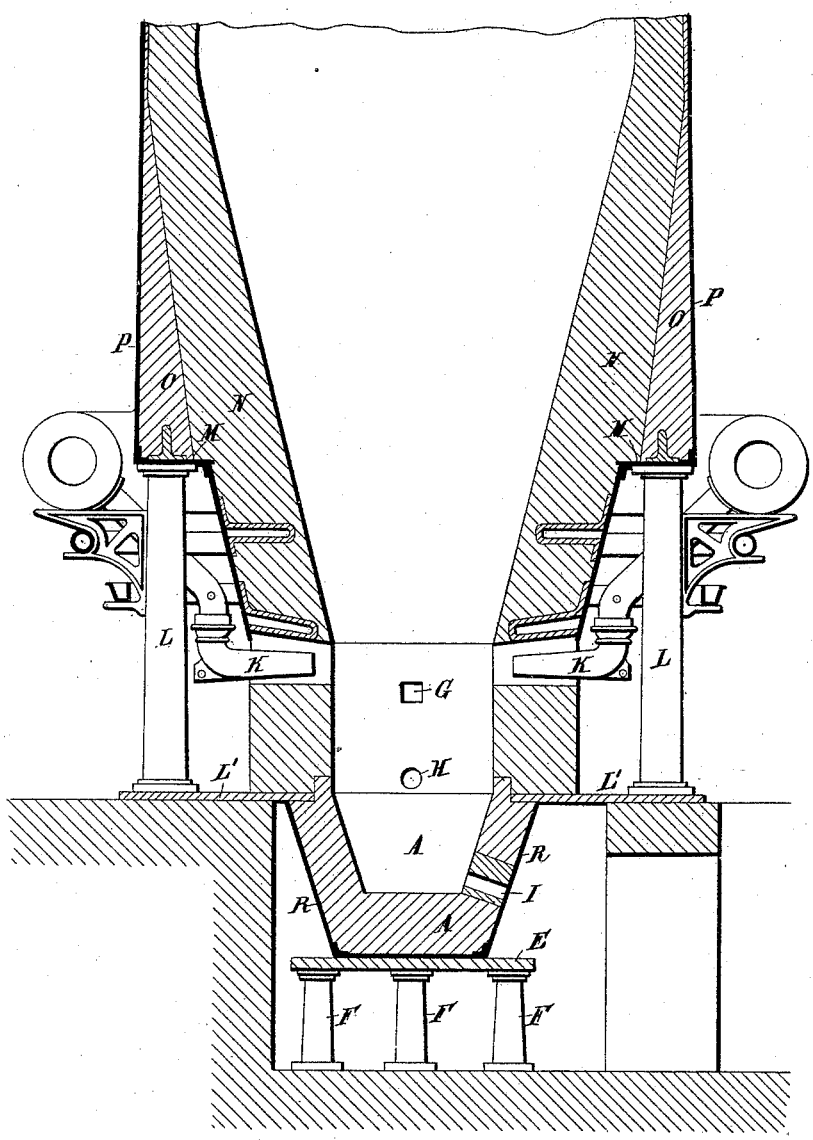

UNITED STATES PATENT OFFICE.

HENRY RYAN LEWIS, OF LONDON, AND CHARLES BERRY PHILLIPS, OF CHESTER, ENGLAND.

PROCESS OF EXTRACTING METALS FROM REFRACTORY ORES.

SPECIFICATION forming part of Letters Patent No. 487,188, dated November 29, 1892.

Application filed June 26, 1888. Serial No. 278,236. (No specimens.) Patented in Italy January 2, 1888, XXII, 24,746, XLIX, 136; in England January 10, 1888, No. 421; in Belgium January 10, 1888, No. 84,588; in Spain April 15, 1888, No. 9,124; in Victoria July 11, 1888, No. 5,964; in New South Wales July 12, 1888, No. 774; in Tasmania July 14, 1888, No. 589/10; in South Australia July 18, 1888, No. 1,071; in New Zealand July 26, 1888, No. 3,131; in Portugal August 30, 1888, No. 1,383; in Queensland November 27, 1889, No. 816, and in Austria-Hungary May 18, 1891, No. 46,207 and No. 2,769.

*To all whom it may concern:*

Be it known that we, HENRY RYAN LEWIS, mining engineer and metallurgist, a resident of London, and CHARLES BERRY PHILLIPS, gentleman, a resident of Chester, England, subjects of the Queen of Great Britain, have invented new and useful Improvements in the Process of Extracting Metals from Refractory Ores, (for which we have obtained Letters Patents in Great Britain, No. 421, dated January 10, 1888; in Victoria, No. 5,964, dated July 11, 1888; in Tasmania, dated July 14, 1888, No. 589/10; in Queensland, No. 816, dated November 27, 1889; in New Zealand, No. 3,131, dated July 26, 1888; in South Australia, No. 1,071, dated July 18, 1888; in New South Wales, No. 774, dated July 12, 1888; in Belgium, No. 84,588, dated January 10, 1888; in Austria-Hungary, dated May 18, 1891, No. 46,207 and No. 2,769; in Italy, dated January 2, 1888, Vol. XXII, No. 24,746, Reg. Gen., and Vol. XLIX, No. 136, Reg. Att.; in Spain No. 9,124, dated April 15, 1888, and in Portugal, No. 1,383, dated August 30, 1888,) of which the following is a specification, reference being had to the accompanying drawings.

Our invention relates to the extraction of gold and silver from auriferous and argentiferous ores, and comprises an improved method or process which is more especially advantageous for the treatment of refractory or rebellious and complex ores.

By our invention we provide for the reduction of the said ores and the extraction of the precious metals therefrom by means of a blast-furnace of the kind or class generally used in the production of pig-iron, and we can use either existing or specially-constructed furnaces of this kind for the treatment of ores according to our said invention.

We sometimes effect the extraction of the precious metal or metals simultaneously with the manufacture of pig-iron or of alloys, such as ferro-manganese, spiegeleisen, chrome-iron, or tungsten-iron.

Blast-furnaces of the kind or class known as "water-jacket smelting-furnaces" have in some instances been used for the reduction of ores containing gold or silver; but such furnaces are not adapted for the production of pig-iron and their capacity is very small as compared with the blast-furnaces which we employ. Moreover, the process of treating the ores differs materially from our improved process.

In treating the auriferous or argentiferous ores in a blast-furnace according to our said invention suitable proportions of lead or of ore containing lead and of manganiferous or other iron ore, manganese ore, or a combination of these ores are mixed with the auriferous or argentiferous ores or introduced therewith into the furnace. Refractory gold and silver ores generally contain more or less sulphur, arsenic, zinc, antimony, or other substances which if not carried away or expelled from the ores during the roasting thereof in the upper portion of the furnace would cause the formation of a pasty mass, so that the furnace would "hang" and the result of the process would thus be depreciated. In our process, however, these substances being reduced, if necessary, to the metallic state in the upper portion of the furnace are volatilized by the heat and deposited in the flues or chambers of the furnace as flue-dust or as oxides of these metals or elementary substances. Should it be considered expedient to utilize the waste heat or gases from the furnace, these products will be saved in the manner above described. If, however, it is not necessary or desirable to utilize the waste heat of the gases, these products may be either saved in flues or chambers or permitted to escape at once into the atmosphere. If the auriferous and argentiferous ores contain a considerable proportion of sulphur, arsenic, antimony, bismuth, or the like, it is advisable to roast these ores previous to their treatment in the blast-furnace, and it may be advantageous to roast them with common salt, (chloride of sodium,) converting them into oxides and chlorides, because large quantities of sulphides or sulphurets are detrimental to the free working of the furnace, whereas oxides and chlorides are more readily dealt with therein. The roasting of the ores can, if desired, be effected by means of the waste gases from the blast-furnace. As a means of increasing the heat of the furnace, if necessary or should it be found that the furnace hangs, we introduce into the furnace through the tuyeres a jet or jets of liquid hydrocarbon, such as crude or refined petroleum, which, together with the air-blast, produces an intense heat, and thus overcomes any disposition of the burden to hang or become pasty and insures the successful working of the furnace. On the proportion of manganese and iron or manganiferous ores used with the auriferous or argentiferous ores (either native or prepared, as above described) in the blast-furnace will depend the successful formation of a fusible slag and the successful reduction and extraction of the various metals hereinafter mentioned.

When the extraction of the precious metals is to be effected simultaneously with the production of pig-iron or an alloy of iron, it may not always be necessary to introduce into the furnace oxide of manganese or oxide of iron other than that present in the ore from which the pig-iron or alloy of iron is to be made, the mixture or burden depending on the analyses of the different ores to be treated. Moreover, when the auriferous or argentiferous ores contain a sufficient quantity of lead for the purpose hereinafter specified it is unnecessary to add to the charge any further quantity of lead or of ore containing lead. The ores, together with any iron or lead that may be required, the fuel, and the requisite flux or fluxes are charged into the blast-furnace, which is worked with either hot or cold blast. The burden is made up of certain proportions of the different ores and fluxes, according to the various analyses thereof, and such proportions should be maintained or altered, according to the analysis of the ores under treatment, from time to time while the blast-furnace is in operation.

For instance, assuming that we are treating an auriferous and argentiferous ore as taken direct from the mine (without any dressing or washing) the analysis of which is about as follows, viz: silica, 3.77; alumina, .88; lime, 5.94; magnesia, .22; oxide magnesia, 2.15; carbonic acid, 7.05; iron, 36.99; zinc, 6.74; copper, 3.40; lead, traces; sulphur, 28.74; oxygen, 2.03; combined water, 1.38; moisture, .52; gold, three ounces, five pennyweights, eight grains; and silver, eighteen pennyweights twenty-two grains per ton of ore. As this is a pyritous ore, we first calcine it to drive off the sulphur and carbonic acid. We then make up the charge or burden of the furnace in about the following proportions, (the ore being deficient in lead for our purpose a portion would have to be added:) ten hundred-weight of fifty per cent. iron ore and five hundred-weight of fifty per cent. manganese ore or their equivalent of manganiferous iron ores, five hundred-weight of the above-mentioned calcined ore, three-fourths of a hundred-weight of lead ore, (galena,) five hundred-weight of lime or other fluxing material, more or less, according to the nature of the iron ores employed, and twenty to twenty-five hundred-weight of fuel.

The result of treating one hundred tons of iron ore, fifty tons of manganese ore, fifty tons of the calcined ore, and seven and one-half tons of lead ore would be about ninety tons of spiegeleisen or ferro-manganese, allowing about fifteen tons for loss, and an alloy or matte containing about five tons of lead, five tons of copper, two hundred and forty ounces of gold, and seventy ounces of silver. The zinc would, moreover, be recovered as an oxide in the flues or in chambers provided for the purpose.

As another example we take a well-known ore the average analysis of which is about as follows, viz: iron, 24.50; arsenic, 21.40; zinc, 4.97; lead, 5.26; copper, .40; antimony, .67; sulphur, 20.03; silicious insoluble matter, 21.03; gold, silver, oxygen, and loss, 1.67, the average produce of gold being about four ounces six pennyweights and of silver about six ounces six pennyweights per ton of ore. As this ore contains about forty per cent., jointly, of arsenic and sulphur, we first drive off these substances by calcination, and we make up the furnace burden in about the following proportions: ten hundred-weight of fifty per cent. iron ore and five hundred-weight of fifty per cent. manganese ore or their equivalent of manganiferous iron ores, five hundred-weight of the calcined ore above mentioned, five hundred-weight of lime or other fluxing material, more or less, according to the nature of the iron ores, and twenty to twenty-five hundred-weight of fuel. The result of treating one hundred tons of iron ore, fifty tons of manganese ore, and fifty tons of this calcined ore would be about eighty tons of spiegeleisen or ferro-manganese, allowing about fifteen tons for loss, and an alloy or matte containing about six tons of lead, ten hundred-weight of copper, three hundred and fifty ounces of gold, and five hundred ounces of silver. The zinc would, moreover, be recovered as an oxide in the flues and chambers.

We give, also, an example of treating another well-known refractory ore the analysis of which is about as follows, viz: copper, 24.50; bismuth, 10.80; lead, 1.05; iron, 17.80; antimony, .20; sulphur, .50; carbonic acid, 9.60; silicious soluble matter, twenty-four; gold, silver, oxygen, and loss, 11.55, the average produce of gold being about ten and one-fourth ounces and of silver about forty and one-half ounces per ton of ore. As the quantity of lead in this ore is small, we would add a portion to the furnace burden and make it up in about the following proportions: ten hundred-weight fifty per cent. iron ore and five hundred-weight fifty per cent. manganese ore or the equivalent of manganiferous iron ores, five hundred-weight of the above-mentioned refractory ore, three-fourths hundred-weight of lead ore, (galena,) five hundred-weight of lime or other fluxing material, more or less, according to the nature of the iron ores employed, and twenty to twenty-five hundred-weight of fuel. The result of treating one hundred tons of iron ore, fifty tons of manganese ore, fifty tons of the said refractory ore, and seven and one-half tons of lead ore would be about seventy tons of spiegeleisen or ferro-manganese, allowing about twelve tons for loss, and an alloy or matte containing about five tons of lead, twelve tons of copper, five hundred ounces of gold, and two thousand ounces of silver. The bismuth would be dispelled or found in the flues and chambers if their temperature is not too high.

As another example we take an auriferous pyritous ore the average analysis of which is about as follows, viz: iron, 32.33; lead, 3.40; zinc, 4.53; arsenic, 3.48; sulphur, 31.70; copper, .93; gold, silver, oxygen, moisture, and loss, 1.68, the gold averaging 3.70 and the silver 9.30 ounces per ton of ore. As these ores contain a large percentage of sulphur, we first calcine them. This calcination will also drive off the arsenic. In making up the burden of the furnace we use about ten hundred-weight of fifty per cent. iron ore and five hundred-weight of fifty per cent. manganese ore or their equivalent of manganiferous iron ore, five hundred-weight of the above-mentioned calcined ore, one-fourth hundred-weight of lead ore, (galena,) five hundred-weight of lime or other fluxing material, more or less, according to the nature of the iron ores, and twenty to twenty-five hundred-weight of fuel. The result of treating one hundred tons of iron ore, fifty tons of manganese ore, fifty tons of this calcined ore, and two and one-half tons of lead ore would be about eighty-five tons of spiegeleisen or ferro-manganese, allowing about fifteen tons for loss, and an alloy or matte containing about five tons of lead, two hundred and seventy ounces of gold, six hundred and seventy ounces of silver, and about one ton of copper. The zinc would, moreover, be recovered in the flues and chambers as an oxide.

The average analysis of the Anglesea or Wicklow blue-stone may be taken as under, viz: about thirty-two per cent. of zinc, twelve per cent. of lead, 1.50 per cent. of copper, four per cent. of iron, twenty-eight per cent. of sulphur, twelve ounces of silver, one-fourth ounce of gold, and twenty-two per cent. of silica. Before treating this class of ore in the blast-furnace it is desirable, on account of the large percentage of sulphur contained therein, to first calcine the ore and then to arrange the furnace burden in such proportions as will work to advantage with the iron, manganese, or manganiferous iron ores that are to be used with it. As an example of the burden to be used we give the following: say, ten hundred-weight of fifty per cent. iron ore, five hundred-weight of fifty per cent. manganese ore, five hundred-weight of the calcined blue-stone, (this we reckon at about thirty-five per cent. richer in metals than the raw ore,) five hundred-weight of lime or other flux, and twenty-five hundred-weight of fuel. The result of treating one hundred tons of iron ore, fifty tons of manganese ore, and fifty tons of the calcined blue-stone will be about from sixty-five to seventy tons of ferro-manganese, zinc oxide equal to about forty-five tons of metallic zinc, and an alloy or matte containing about seven tons of lead, eight hundred ounces of silver, seventeen ounces of gold, and two tons of copper.

By the examples above given we illustrate the method of mixing the ores already alluded to. The burden should, however, be modified, according to the class of ores to be treated, so as always to insure the free working of the furnace, and we deem it preferable to mix several of the different ores, thus probably making it easier to obtain the necessary proportions, as one ore may contain ingredients which another ore requires, and so the ores will assist each other in the reduction.

In giving the foregoing examples we have stated the proportions of the various ores, fluxes, and fuel that we consider would be advisable to use, so that the produce of either the iron, ferro-manganese, spiegeleisen, or other substances will be of a merchantable value. In practice, however, and according to the heat of the blast and the quantity and quality of the fuel employed it may be judicious to alter the proportions of the burden in favor of the ores containing the precious metals or the reverse. Should this not be considered essential to the successful working of the process, the burden can be otherwise altered in such manner and proportions as may be deemed advisable so as to insure the free working of the furnace. The percentage of loss of the baser metals will generally be influenced by the temperature of the blast, the quality and quantity of the fuel, the heat at which the furnace is working, and the description of slag running. After reduction the melted metals collect in the hearth or crucible of the blast-furnace, the lead forms an alloy with the gold or silver, or both, and the copper (if any) and settles at the bottom of the hearth or crucible, while the molten iron or its alloy, being of less specific gravity, floats upon the surface of the said lead alloy and forms a protecting-layer above the same, which prevents oxidation thereof. Such other ingredients of the ores as are incapable of volatilization at the temperature employed, together with the flux or fluxes, form a fusible slag, which is drawn off in the ordinary manner. The molten iron is periodically drawn off by means of a tap-hole provided at a suitable level for the purpose. The lead alloy is periodically drawn off by means of a tap-hole provided for the purpose at or near the bottom of the hearth or crucible.

Care must be taken to have the tap-hole for the iron a sufficient height above the bottom of the hearth or crucible to insure that the level of the lead alloy shall not rise above the said tap-hole. Care must also be taken when drawing off the said alloy from the bottom tap-hole that this tap-hole is closed before the level of the said alloy has descended sufficiently to permit the escape of any of the iron therewith.

In order that the method of drawing off the various products may be clearly understood, we would observe that provision in the first place should be made in the usual manner for drawing off and disposing of the slag. At stated and regular intervals the upper tap-hole should be opened and the iron or its alloy drawn off to the level thereof, the said tap-hole being afterward made up. Then, if the alloy of lead with the precious metals is estimated to be in sufficient quantity to necessitate the drawing off of the same, the lower tap-hole should be opened and kept open until the said alloy is drawn off. This tap-hole should be stopped and made up before any iron or alloy of iron remaining below the upper tap-hole and above the upper surface of the lead alloy commences to run. The furnace is then cleaned, if necessary, and made ready for repeating the operation. During the tapping the blast may require to be shut off.

In treating refractory or complex ores according to our said invention the said ores previous to being charged into the blast-furnace are calcined, if deemed necessary, to drive off any excess of sulphur, arsenic, or other substance capable of volatilization which may be present in the ores. For this purpose any well-known or suitable calcining furnace or kiln may be employed, and, if desired, the waste gases may be used as above stated.

To prevent loss by percolation of the lead alloys through the joints of the brickwork of the hearth or crucible of the blast-furnace, this part of the furnace must be built completely tight.

We prefer that the crucible should be molded or otherwise made from one piece or block of refractory material—such as Stourbridge fire-clay or ganister—and that the furnace should be constructed as illustrated in vertical central section in the accompanying drawings, in which—

A is a solid-hearth crucible of Stourbridge fire-clay or other suitable material. This crucible is built or placed upon or fitted into a stone foundation B and is surrounded by an outer casing C of fire bricks or blocks, so that the weight of the furnace or its interior lining will not rest wholly on the crucible, but will be distributed over the said casing C and the crucible, thus insuring that no undue pressure shall be thrown on the sides of the crucible.

Ground ganister or fire-clay is preferably rammed in to serve as packing between the crucible and the fire-brick casing and also under the crucible, as at D, so that in case of fracture or leakage of the crucible the molten metals will not escape. The outer casing C is, if desired, surrounded by an iron casing, which may or may not be water-cooled. The stone base or foundation B is preferably placed upon an iron plate E, supported above the level of the ground on short columns F, of metal or masonry. We thus provide for preventing any leakage into the ground of the molten metals should any accident occur to the crucible and the stone foundation. As the metals are of great value, it is very desirable that all necessary precaution should be taken to prevent loss thereof.

G is the slag-hole or tap-hole for the slag.

H is the tap-hole for the iron, and I is the tap-hole through which the auriferous or argentiferous lead is to be drawn off.

K K are the tuyeres.

L L are pillars or columns resting upon a foundation L' and supporting at their upper ends an annular plate or entablature M, of iron or other metal.

N indicates the boshes and inner lining of the furnace.

O is a lining or casing of fire-brick, and P is an outer metal casing, both of which rest upon the plate or ring M.

Q is an opening for permitting the cleaning of the furnace. This opening is closed by means of a plate or stone door from the aperture G, in which the slag can be drawn.

In the apparatus shown in Figure 2 we dispense with the brick casing, the stone foundation, and the packing shown in Fig. 1 and we place the crucible directly upon the iron plate E. The crucible is incased with iron, as at R, and may be jacketed and water-cooled, if necessary. The crucible in this form of construction can be readily removed and replaced, the columns L, the entablature M, and the iron casing P supporting the entire weight of the furnace from the tuyeres upward.

The gold, silver, and any other metals that may be alloyed with the lead drawn from the crucible are separated from the lead and from each other by any well-known or suitable method or process.

In some instances the metals or other substances volatilized during the process are obtained as by-products by condensation of the vapors evolved in flues or chambers specially provided and prepared for the purpose. In other instances the said vapors are permitted to escape into the atmosphere.

Among the ores that may be treated by our improved process are the following, viz: gold, silver, lead, platinum, cobalt, tin, antimony, zinc, chromium, tungsten, manganese, iron, copper, bismuth, nickel, and any of the rarer metals, auriferous and argentiferous copper and iron pyrites, or auriferous and argentiferous arsenical pyrites, or tellurides when these contain gold or silver, also cupreous gold and silver ores, and the ores obtained from Anglesea and elsewhere and known as "blue-stone."

What we claim is—

The improved method or process of extracting precious metals from auriferous or argentiferous ores, consisting in reducing such ores in a blast-furnace, together with ores of manganese, iron, and lead and with a flux in the requisite proportions, having regard to the amount of manganese, iron, and lead present in the ores to be treated, and then drawing off from time to time through tap-holes situated at different levels the iron or its alloy and the alloy of lead with the precious metals, substantially as hereinbefore described.

In testimony whereof we have hereunto signed our names in the presence of two subscribing witnesses.

HENRY RYAN LEWIS.
CHARLES BERRY PHILLIPS.

Witnesses:
CHARLES F. ROSEBY,
A. SWEENY.